April 22, 1952 — F. B. WILLIAMS — 2,593,949
STIRRING AND SCRAPING DEVICE
Filed Aug. 9, 1950
FIG. 1.  FIG. 2.  FIG. 4.
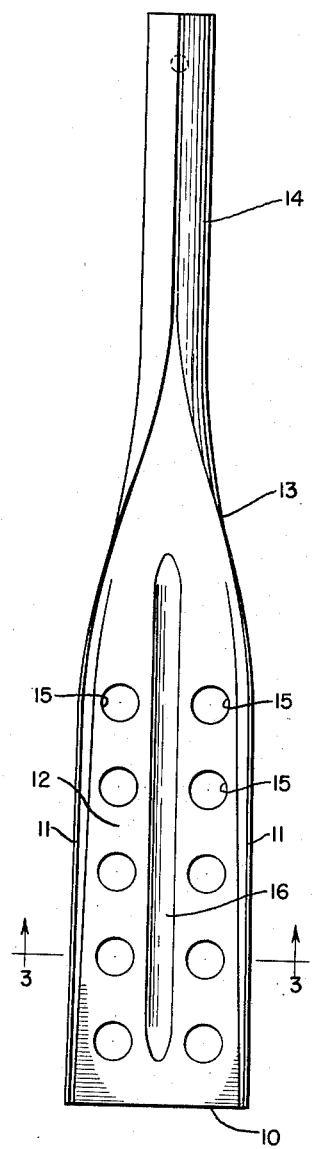
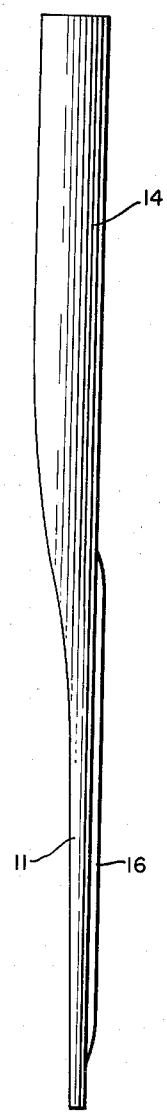
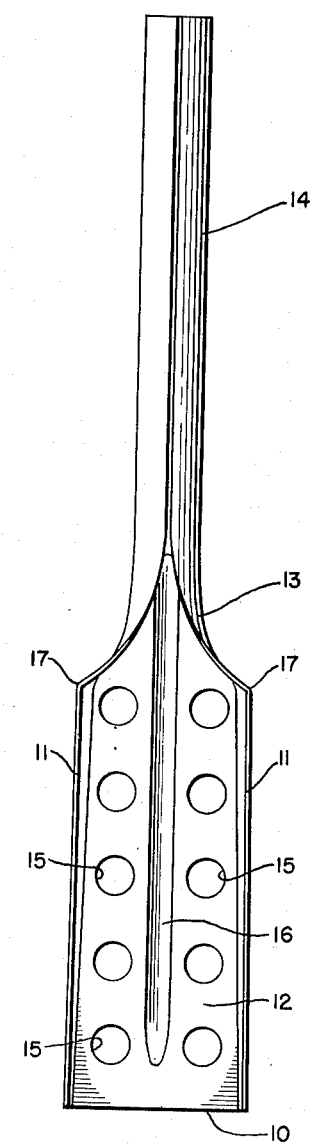
FIG. 3.
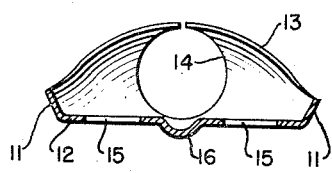
INVENTOR:
Frank B. Williams
BY:
Gary, Desmond & Parker
ATTORNEYS Patented Apr. 22, 1952

2,593,949

UNITED STATES PATENT OFFICE 2,593,949

STIRRING AND SCRAPING DEVICE

Frank B. Williams, Chicago, Ill.

Application August 9, 1950, Serial No. 178,543

2 Claims. (Cl. 259—144)

This invention relates to a novel stirring and scraping device particularly adapted for use as a mixing paddle.

It is an object of the present invention to provide a mixing paddle adapted to effectively and thoroughly mix any mixable substance contained in any receptacle, and to dislodge solid, gelled, plastic or other adherent material, such as for example paint pigment, from the interior surfaces of the container so that a rapid homogeneous mixture may be obtained and all portions of the container contents effectively utilized.

Further objects relate to economy, efficiency and ruggedness of construction, and to details and arrangement of parts as will be aparent from a consideration of the following specification and accompanying drawings, wherein:

Fig. 1 is a front elevational view of one form of my mixing paddle, and

Fig. 2 is a side elevational view thereof.

Fig. 3 is a section on the line 3—3 of Fig. 1.

Fig. 4 is a front elevational view of a modified form of my mixing paddle.

Referring to the drawings, and particularly Figs. 1 to 3, my mixing paddle is formed of a single piece or strip of sheet metal, preferably rectangular so as to provide a lower straight edge 10, the lower end portion being formed to provide a pair of inclined side edges 11—11, both being bent forwardly substantially normal to the intermediate body or blade portion 12, to provide scraper edges. The side edges of the metal strip are gradually overfolded intermediate the length of the metal strip, as at 13, and then brought into substantially contiguous relationship to form the tubular handle portion 14 at the opposed end of the strip.

The blade portion of the device is formed with a plurality of longitudinally spaced apertures 15, preferably in a plurality of longitudinally extending rows, and intermediate those rows the blade is depressed to provide a longitudinally extending rib as at 16. In the illustrated forms of device, there are two longitudinally extending rows of longitudinally spaced apertures 15 and one central reinforcing or rigidifying rib 16. Although the apertures 15 are shown circular, it will be understood that they may be of any other curvilinear or angular shape or size. It will also be understood that the apertures of one row may be staggered with respect to those of an adjacent row.

The form of paddle shown in Figs. 1 to 3 is highly suitable for mixing any mixable substance in the container where the solid or pigment is in any type vehicle and where the pigment generally settles at and adjacent to the bottom or clings to the sides of the container. The straight lower edge 10 of the blade, aided by the inclined side edges 11, enable the pigment to be scraped off the bottom and sides of the container, and the pigment is thereafter readily broken up and rapidly interspersed in the vehicle by being forced repeatedly through the apertures 15 in the blade 12 against the forward hand movement of the paddle.

The form of mixer shown in Fig. 4 is substantially the same as that of Figs. 1 to 3, with the exception that the side edges 11 before merging into the tubular handle portion 14, turn abruptly at a sharp angle to form shoulders 17. The purpose of these shoulders is to enable full side scraping including scraping off of any pigment or other adherent material which may be lodged underneath and against the corner formed by the overhanging lip or cover seat convention on containers. This is of particular importance in paints of the aqueous vehicle type where the pigment tends to remain or lodge at or near the top of the container prior to mixing.

Although I have illustrated and described the preferred embodiments of my invention, it will be understood that minor modifications may be made in details without departing from the spirit thereof as particularly pointed out in the following claims.

I claim as my invention:

1. A stirring, scraping and mixing device composed of a single substantially rectangular strip of sheet metal, the side edges of one portion thereof being bent to substantially normal inclination to one face of the strip to provide a pair of substantially straight scraper edges and a substantially flat intermediate blade section, the side edges being abruptly folded inwardly intermediate the length of the strip to provide angular scraping shoulders and then gradually overfolded into substantially contiguous relationship at the opposed end of the strip to provide a tubular handle portion.

2. A stirring, scraping and mixing device composed of a single rectangular strip of sheet metal, the side edges of one end portion thereof being bent to substantially normal inclination to one face of the strip to provide scraper edges and a substantially flat intermediate blade section, the side edges being abruptly folded inwardly intermediate the length of the strip to provide angular scraping shoulders and then gradually bent to substantially meeting engagement to provide a tubular handle section at the opposed end, said blade being formed with a plurality of rows of longitudinally spaced apertures and indented between said rows to form a longitudinally extending rib.

FRANK B. WILLIAMS.

REFERENCES CITED

The following references are of record in the file of this patent:

UNITED STATES PATENTS

| Number | Name | Date |
|---|---|---|
| 1,098,070 | Whitney | May 26, 1914 |
| 1,460,007 | Williams | June 26, 1923 |
| 1,926,944 | Hester | Sept. 12, 1933 |
| 1,969,162 | Smith | Aug. 7, 1934 |